Figure 1:
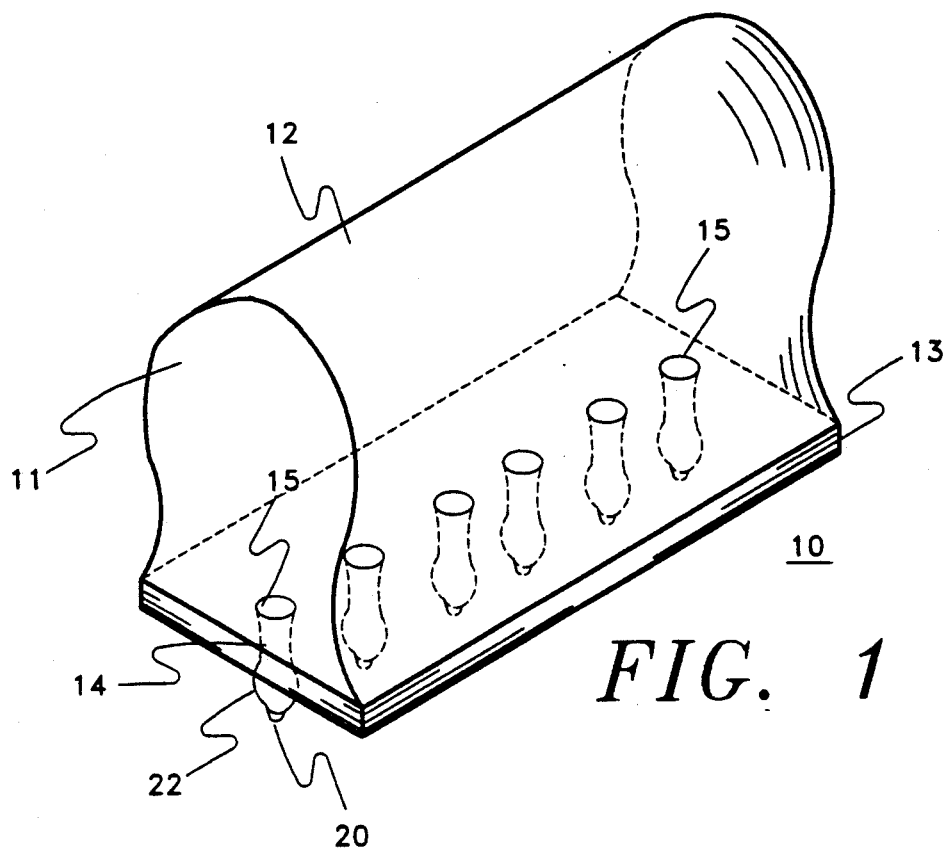
Figure 2:
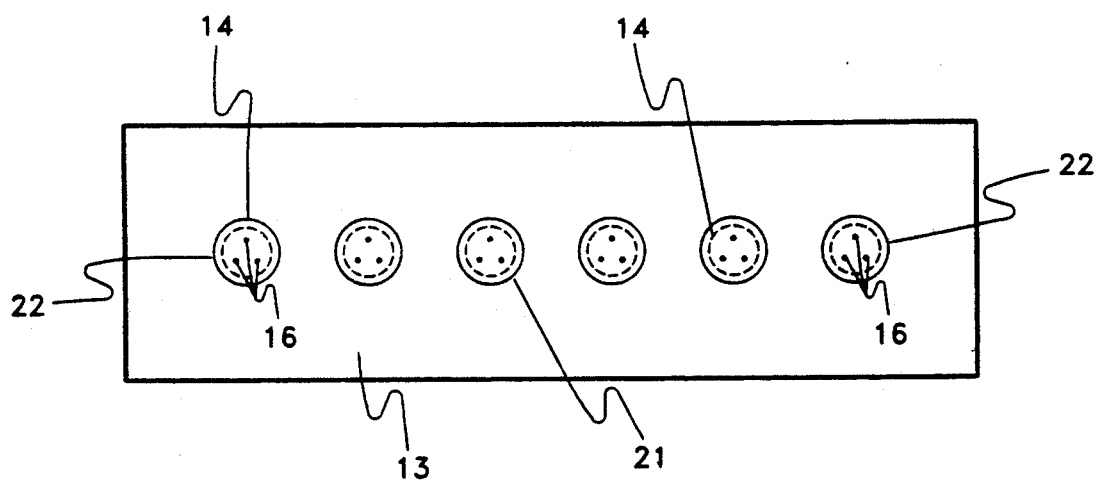
Figure 3:
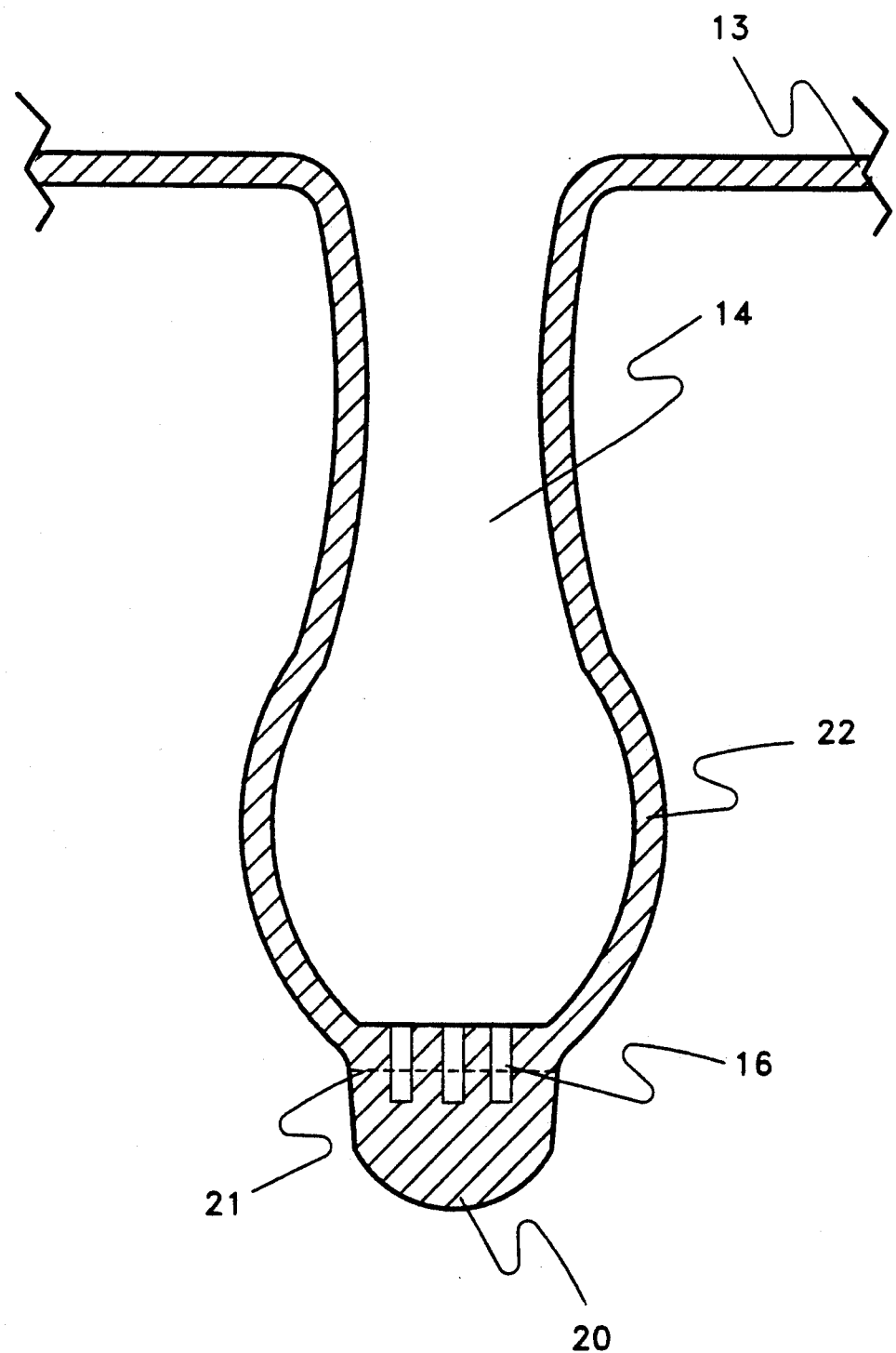

United States Patent [19]
Robinson

[11] Patent Number: 5,183,006
[45] Date of Patent: Feb. 2, 1993

[54] DISPENSING LIQUID ANIMAL PICK APPLICATOR

[76] Inventor: Maureen G. Robinson, 428 Beacon St., Chestnut Hill, Mass. 02167

[21] Appl. No.: 826,489

[22] Filed: Jan. 27, 1992

[51] Int. Cl.$^5$ ............... A01K 13/00; A45D 24/22; B43K 5/14
[52] U.S. Cl. ................... 119/85; 119/156; 132/114; 401/132
[58] Field of Search .............. 119/83, 85, 86, 156, 119/157; 401/132, 133; 132/112, 113, 114, 115; 222/92, 94, 107, 541, 326, 327, 565, 330

[56] References Cited

U.S. PATENT DOCUMENTS

| | | | |
|---|---|---|---|
| 946,622 | 1/1910 | Thurman | 132/114 |
| 1,014,465 | 1/1912 | Hall | 132/114 |
| 3,353,721 | 11/1967 | Love | 132/114 |
| 3,418,059 | 12/1968 | Robe | 401/132 |
| 3,591,053 | 7/1971 | Thomas | 222/92 |
| 4,543,913 | 10/1985 | Wilkeson | 119/85 |
| 4,585,018 | 4/1986 | O'Connor | 132/112 |
| 4,617,875 | 10/1986 | Holland | 119/85 |
| 4,779,572 | 10/1988 | Freulon | 119/85 |
| 4,799,456 | 1/1989 | Young | 119/83 |
| 4,802,607 | 2/1989 | Johnson | 222/326 |
| 4,902,154 | 2/1990 | Valeman | 401/132 |
| 4,958,596 | 9/1990 | Belsart | 119/86 |
| 4,973,183 | 11/1990 | Shevick et al. | 401/278 |

FOREIGN PATENT DOCUMENTS 43519 1/1982 European Pat. Off. ............ 132/112

Primary Examiner—John G. Weiss
Attorney, Agent, or Firm—William B. Ritchie

[57] ABSTRACT

A disposable applicator for dispensing liquid formulations to the undercoat and skin of animals. The invention is a substantially hermetically sealed applicator that dispenses liquid formulations to the coat and skin of the animal through a single row of applicator prongs adapted to comfortably move through the animal's coat and along the skin. Liquid formulation is released from each applicator prong through a plurality of delivery ports adapted in size to permit the flow of liquid to be easily controlled by the pressure from the user's hand. Liquid is prevented from spilling from applicator prior to use by means of integral closure protuberances on the end of each applicator prong which must be cut to permit the liquid to flow. Once the liquid formulation is dispensed, the applicator is discarded.

4 Claims, 2 Drawing Sheets

DISPENSING LIQUID ANIMAL PICK APPLICATOR

BACKGROUND OF INVENTION

1. Field of the Invention

The invention relates to an apparatus for dispensing an efficacious formulation to the undercoat and skin of an animal.

2. Description of Related Art

Animal care liquids are widely used on animals. Prior to liquid dispensers, treatment substances were applied to the animal by either pouring the liquid directly from a container or spraying onto the animal's coat. This method unevenly distributes the liquid, is slow and cumbersome and may startle the animal. Direct distribution by the pet owner, animal groomer or veterinarian can be hazardous and irritable due to chemical inhalation and skin contact. Furthermore, the animal may experience discomfort if liquid comes in contact with the animal's ears, nose and eyes. Despite the numerous designs of liquid dispensers for animals that have been developed over the years, none of the designs meet the standards for a disposable dispenser that is only meant to apply to liquid formulation, not to be a grooming device.

U.S. Pat. No. 4,543,913, issued to Wilkenson, discloses a combined applicator and grooming brush for animals. Because the dispenser is not disposable, it must be cleaned after each application. Numerous rows of comb-like picks make the device more expensive to manufacture and more difficult to clean. Liquid is dispensed only when downward pressure is applied to the dispenser making the process uncomfortable to the animal and difficult on the operator.

U.S. Pat. No. 4,958,596, issued to Belsam, discloses a pet grooming kit with an applicator comprising an array of treatment liquids stored in a flexible container. Because the kit contains several different doses of liquid it is expensive to manufacture and limits the consumer to purchasing all treatments. The containers of liquid are attached to an applicator and when attached, serve as a handle. A handle disperses the pressure applied on the applicator and requires more energy to brush the animal's coat.

U.S. Pat. No. 4,902,154, issued to Valeman, discloses a dispensing brush with barb means to rupture a material packet. The liquid is dispensed from a material packet held in a molded body. A break-away sheet attached to the bristle ends control the release of the material held in the brush body making the device complicated and expensive to manufacture. The liquid packet is ruptured by sharp barbs that tear upon the packet with a release lever. A substantial portion of the liquid formulation can be lost by remaining trapped in the packet.

U.S. Pat. No. 4,973,183, issued to Sheviek et al., discloses a container-application device. A self-contained dispensing valve to control the outlet of liquid is disclosed. Because of the complicated release value, the devise is expensive to manufacture.

U.S. Pat. No. 4,617,875, issued to Holland, discloses a grooming and treatment applicator. As in other devices, substantial numbers of parts, and several rows of picks, are required thus making the device expensive to manufacture and difficult to clean. The housing is rigid rather than flexible, with the flow of fluid accomplished by gravity.

U.S. Pat. No. 4,779,572, issued to Freulon, discloses an apparatus for taking care of the coat of animals that has a handle for connecting the housing to a suction device. A distributor tube in a chamber is provided for spraying a product. Numerous parts result in a high cost of manufacture. Also, the device must be disassembled for cleaning.

U.S. Pat. No. 4,799,456, issued to Young, discloses a combination medication applicator and pet grooming device that relies on a squeezable bulb handle to accomplish fluid flow. This distribution method requires more energy to brush the animal and makes it difficult to apply to hard to reach places. The device also provides an additional interchangeable mounting plate with shorter bristles making it more expensive to manufacture.

An efficient, inexpensive to manufacture, disposable device for dispensing an efficacious formulation to the under coat and skin of an animal is not found in prior art.

SUMMARY OF THE INVENTION

It is an object of the invention to provide an applicator that dispenses an even distribution of the desired liquid formulation directly to the undercoat and skin of an animal without tangling, matting, or otherwise disturbing the animal's coat.

It is still another object of the invention to provide an applicator that permits the application of a liquid formulation without frightening or upsetting the animal.

It is still another object of the invention to provide an applicator that is pre-filled and capable of holding a variety of free flowing liquid formulations depending on the need of the user and animal.

It is still another object of the invention to provide an applicator that is readily controlled in the palm of the user's hand in order to apply the liquid formulation safely around an animal's sensitive areas and in difficult to reach areas without getting the liquid formulation on the user's hands.

It is still another object of the invention to provide an applicator that will not flow until a slight pressure is applied by the operator.

It is still another object of the invention to provide a device that reaches an animals undercoat and skin with greater ease than a brush or comb.

It is a final object of the invention to provide an applicator that is cost efficient and disposable with a capacity to hold sufficient liquid formulation to treat an animal.

The invention is a disposable applicator for dispensing liquid formulations to the undercoat and skin of animals. The applicator has a flexible, compressible handle section that can be easily compressed by the user's hand to control the amount and flow rate of the liquid formulation to be applied. A rigid, substantially rectangular manifold section, attached to said handle section to form a substantially hermetically sealed reservoir of sufficient volume to hold an efficacious amount of liquid formulation within said reservoir until time of dispensing, is also provided.

A plurality of applicator prongs are provided. The prongs are attached to said manifold section, arranged in a single row, with each of said prongs having a bulbous tip, adapted in shape to easily and comfortably penetrate said animal's coat. Each said bulbous tip has at least one fluid delivery port, and with each of said prongs having a removable, closure protuberance that covers said delivery port. When said closure protuberance is in place on said tip, said liquid formulation is prevented from flowing from said applicator prongs. When said closure protuberance is removed, said liquid formulation flows from said delivery port corresponding to the pressure exerted on said handled section by said user.

BRIEF DESCRIPTION OF DRAWINGS

FIG. 1 is an isometric top view of the applicator in accordance with the invention.

FIG. 2 is a bottom view of the applicator manifold section, showing the applicator prongs in detail.

FIG. 3 is a side view of one applicator prong of the applicator in accordance with the invention.

DETAILED DESCRIPTION OF THE INVENTION

FIG. 1 is an exploded view of the applicator in accordance with the invention. Applicator 10 comprises two sections: handle section 12 is shaped to fit comfortably within the user's hand. Section 12 is a thin-walled, pliable material molded to form reservoir 11. Reservoir 11 is filled with the efficacious liquid formula that is to be applied to the animal. Preferably handle section 12 could be manufactured by injection molding, vacuum formed or other suitable means. The preferred dimensions of handle section 12 is 3.5 inches in length with a wall thickness of 1/32 inches.

Handle section 12 is fastened to manifold 13, preferably by electronic welding however, other suitable bonding methods such as adhesives may also be used. Manifold 13 is preferably rigid plastic, substantially rectangular in shape, with a single row of applicator prongs 14 disposed substantially equidistant from one another.

Prongs 14 are hollow plastic projections that can be bonded to manifold section 13 as described above. However, section 13 and prongs 14 may also be made as a single unit that has been injection molded. At the end of each prong 14 is closure protuberance 20 which keeps the liquid formulation within reservoir 11 until applicator 10 is to be used. Preferably, closure protuberance 20 is integral with prong 14 and must be removed by cutting with scissors or knife. In this manner, the liquid formulation is assured of being kept entirely with applicator 10 until time of use.

The end of prong 14, after removal of protuberance 20, is bulbous shaped and permits prong 14 to be easily moved through the coat of the animal. Also, the bulbous shape 22 prevents prong 14 from injuring the skin of the animal in the situation where the animal might move unexpectedly during the application process.

FIG. 2 is a bottom view of the applicator manifold section, showing the applicator prongs in detail. Each prong 14 is shown with closure protuberance 20 removed at dotted line 21, thus exposing delivery ports 16. In the preferred situation, a plurality of delivery ports 16, ideally three, would be used. In this manner, the diameter of each could be kept small to ensure that no liquid will be dispensed unless pressure is exerted on handle section 12 but only slight pressure on handle section 12 will result in the desired flow rate. Further, if one or more of delivery ports 16 should become clogged or otherwise inoperative, there would still be sufficient openings to achieve the desired flow rate. Only six prongs 14 are shown for the sake of clarity, however, preferably the number of prongs should be 5 so that a complete application of liquid formulation can be accomplished in a rapid manner with a minimum of discomfort to the animal. Note that prongs 14 have a substantially increased diameter at the end to form a bulbous portion 22, discussed above.

To use applicator 10, the user easily compresses handle section 12 to force the efficacious formula contained within reservoir 11 to enter openings 15 in manifold section 13 and subsequently flow from delivery ports 16. By keeping delivery ports small, preferably about 1/32 inches in diameter and numerous, preferably three per prong, slight pressure produces the desired flow rate, and no pressure results in stopping the application of liquid formulation.

FIG. 3 is a side view of prong 14 with closure protuberance 20 in place. When closure protuberance 20 is removed (preferably by cutting at line 21), prong 14 has a smooth bulbous shape 22 at the end of prong 14 which permits applicator 10 to be moved through the animal's coat and along the animal's skin with a minimum of discomfort. Preferably prong 14 could be 1" in length with a wall thickness 1/16 inches.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:

1. A disposable applicator for dispensing liquid formulations to the undercoat and skin of animals comprising;

- a flexible, compressible handle section that can be easily compressed by the user's hand to control the amount and flow rate of the liquid formulation to be applied, such that the entire handle section can be compressed;
- a rigid, substantially rectangular manifold section, attached to said handle section to form a substantially hermetically sealed reservoir of sufficient volume to hold an efficacious amount of liquid formulation within said reservoir until time of dispensing, such that once reservoir dispenses with liquid formulation it cannot be refilled;
- a plurality of applicator prongs, attached to said manifold section, arranged in a single row, with each of said prongs having a bulbous tip, adapted in shape to easily and comfortably penetrate said animal's coat, with each said bulbous tip having at least one fluid delivery port, and with each of said prongs having a closure protuberance integral with said prong, such that said liquid formulation is prevented from flowing from said applicator prongs, and when said closure protuberance is removed by cutting off from said prong, said liquid formulation flows from said delivery port corresponding to the pressure exerted on said handle section by said user.

2. The disposable applicator for dispensing liquid formulations to the undercoat and skin of animals of claim 1, wherein said applicator prong further comprises at least three delivery ports.

3. The disposable applicator for dispensing liquid formulations to the undercoat and skin of animals of claim 2 wherein said closure protuberances are integral with said applicator prongs and are removed by cutting off said protuberances to expose said delivery ports.

4. The disposable applicator for dispensing liquid formulations to the undercoat and skin of animals of claim 3 wherein said applicator prongs and said manifold section are molded in a single section.

* * * * *